358-86 SR

OR 3,786,424

United States Patent [19]
McVoy et al.
[11] 3,786,424
[45] Jan. 15, 1974

[54] COMMUNICATIONS SYSTEM FOR DATA TRANSMISSION AND RETRIEVAL

[75] Inventors: David S. McVoy; Richard G. Reynolds, both of Sarasota, Fla.

[73] Assignee: Coaxial Scientific Corporation, Sarasota, Fla.

[22] Filed: Feb. 22, 1972

[21] Appl. No.: 227,752

[52] U.S. Cl. .................... 340/151, 179/2 AS, 178/6
[51] Int. Cl. .................... H04h 9/00
[58] Field of Search .................... 340/167, 151, 171; 179/2 AS, 15 R, 15 BM; 178/DIG. 13

[56] References Cited

UNITED STATES PATENTS

| | | | |
|---|---|---|---|
| 3,093,795 | 6/1963 | Jones | 179/2 AS |
| 3,230,302 | 1/1966 | Bruck et al. | 178/6 PD |
| 3,492,577 | 1/1970 | Reiter et al. | 325/31 |
| 3,586,771 | 6/1971 | Hamburger et al. | 325/31 X |
| 3,619,783 | 11/1971 | Ritter | 179/2 AS X |
| 3,693,090 | 9/1972 | Gabriel | 178/DIG. 13 |
| 3,596,181 | 7/1971 | Dowling | 340/168 R |

FOREIGN PATENTS OR APPLICATIONS

| | | | |
|---|---|---|---|
| 992,725 | 5/1965 | Great Britain | 178/6 PD |

178/6 PD

*Primary Examiner*—Donald J. Yusko
*Attorney*—Roy H. Olson et al.

[57] ABSTRACT

A communications system, such as a cable television system, embodies an arrangement for data transmission which utilizes a combination of time and frequency division. Groups of data transmitters are connected to data retrieval circuitry through switch circuits which are selectively addressed by a predetermined code to provide communication between all of the data transmitters of the group and data retrieval circuitry. The transmission of data from transmitters in the other groups are blocked until the appropriate address code is sent to the associated switch circuit. Circuitry utilizing a synchronous or non-synchronous clock is provided for generating a message marker along with the data pulse train.

14 Claims, 22 Drawing Figures

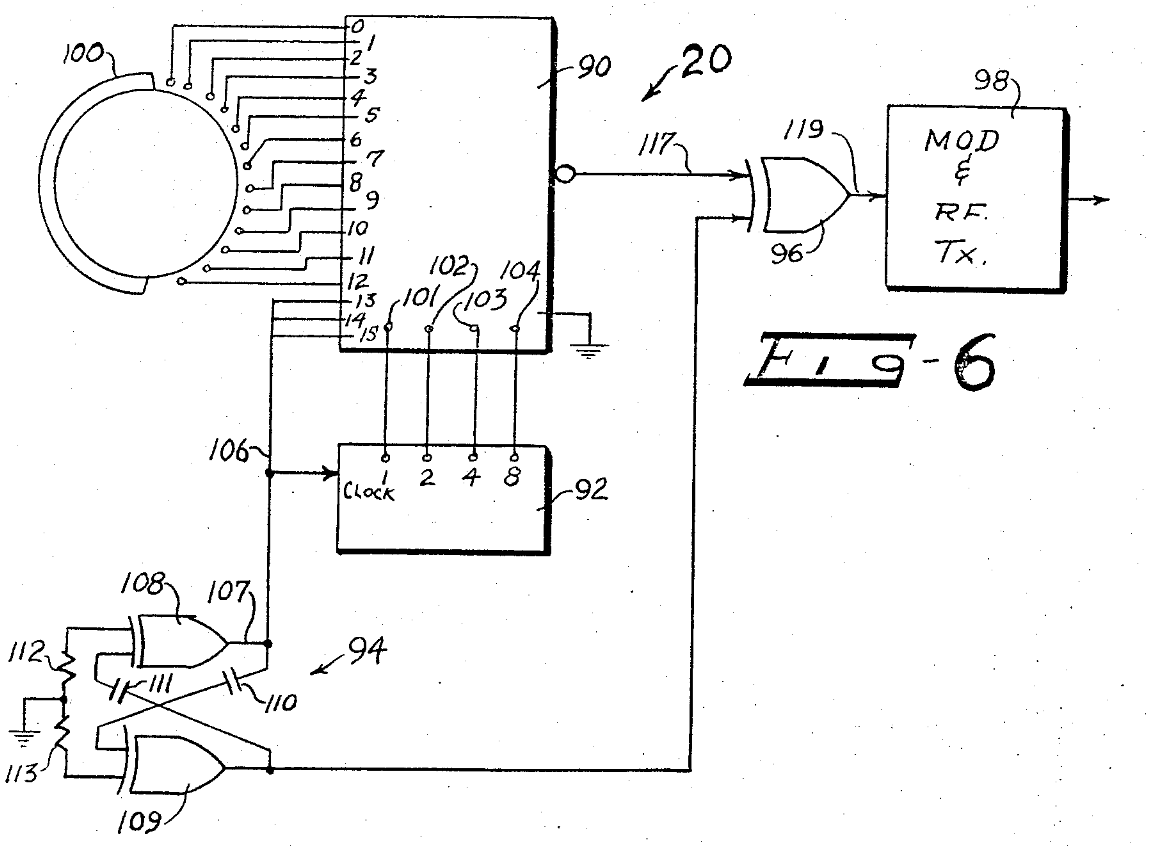
FIG-6
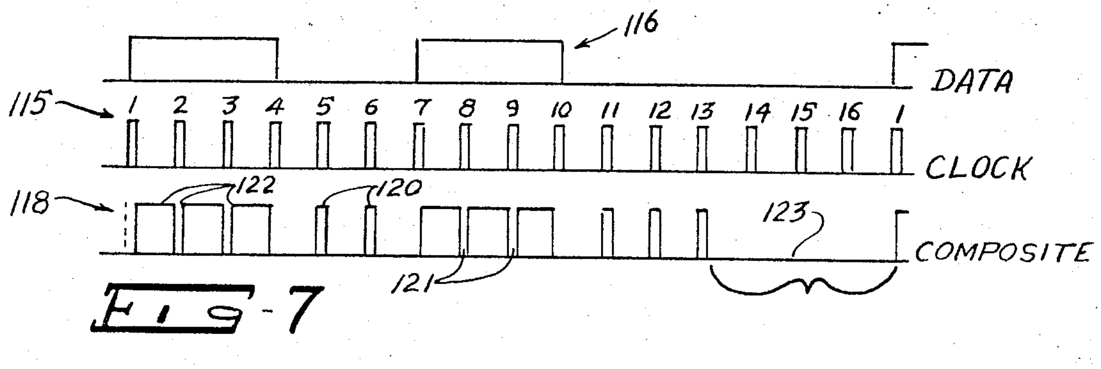
FIG-7
| DATA | CLOCK | COMPOSITE |
|---|---|---|
| 0 | 0 | 0 |
| 0 | 1 | 1 |
| 1 | 0 | 1 |
| 1 | 1 | 0 |
| X | X | 0 |
FIG-8

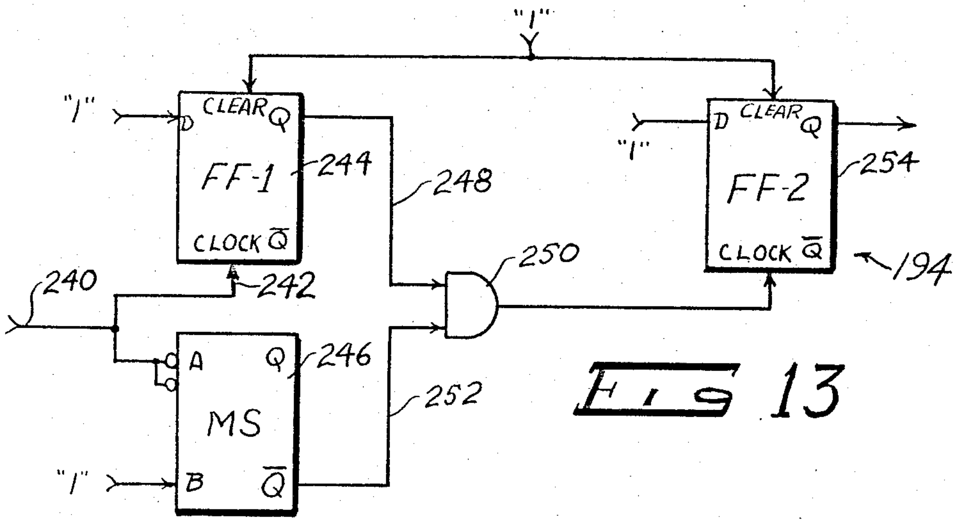
FIG 13
FIG-14
| FF-1 Q | FF-1 Q̄ | MS Q | MS Q̄ | AND | FF-2 Q | FF-2 Q̄ | |
|---|---|---|---|---|---|---|---|
| 0 | 1 | 0 | 1 | 0 | 0 | 1 | 248 |
| 1 | 0 | 1 | 0 | 0 | 0 | 1 | 256 |
| 1 | 0 | 0 | 1 | 1 | 1 | 0 | 258 |
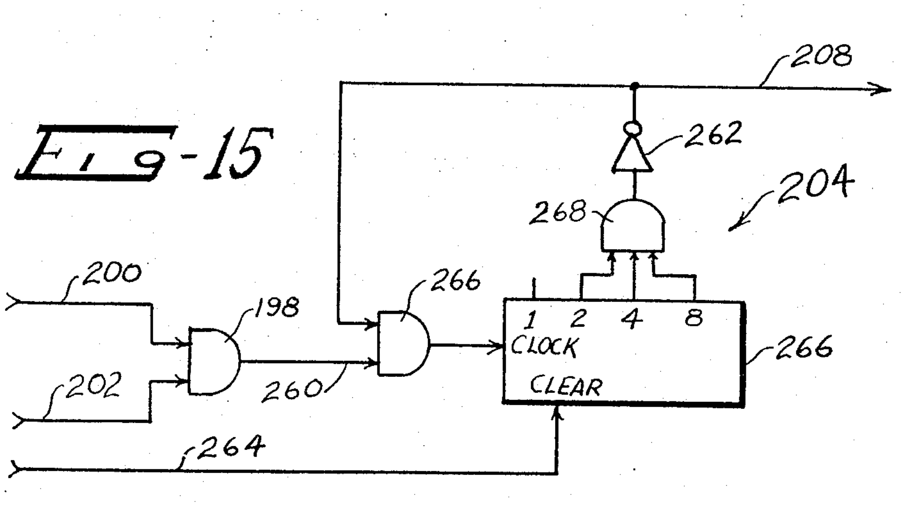
FIG-15
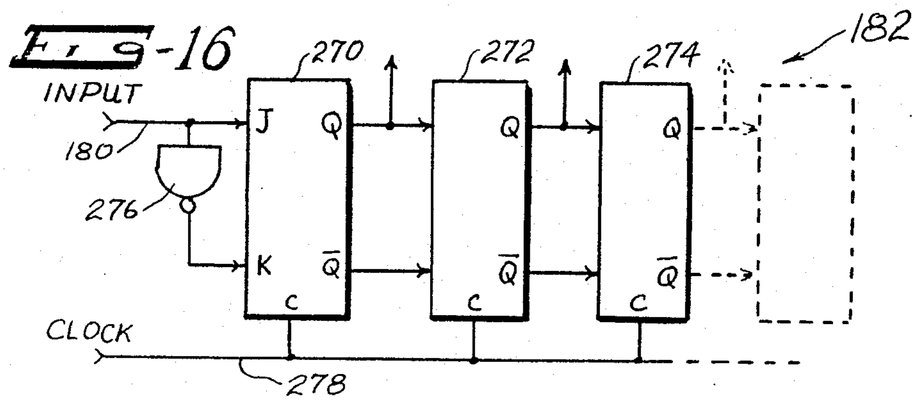
FIG-16

COMMUNICATIONS SYSTEM FOR DATA TRANSMISSION AND RETRIEVAL

BACKGROUND OF THE INVENTION

This invention relates to communications systems for transmitting and receiving data, and is particularly suitable for embodiment in cable television systems or the like.

In communications systems where data are sent from a number of terminal points to a central data retriever, it is often necessary to provide some means for identifying the terminal point so that the exact source of the data will be known. To accomplish this, the data transmission equipment at each terminal point may be costly, particularly if the number of terminal points is large. Therefore, it is desirable in large systems to reduce as much as possible the unit cost of the terminal point data transmitting equipment.

CATV systems constitute one type of communications system that can be used for transmitting data over coaxial cable. These cable television systems often have a large number of subscribers constituting the terminal points of the system wherein the television receivers are located. Cable television systems are capable of providing, in effect, two way communication between the headend and each terminal point. For example, in addition to the RF carriers sent out from the headend to the terminal points, data can be sent back over the cable from the terminal point. These data, which are usually in coded form, may represent a variety of types of information including channel monitoring, alarm responses, subscriber messages, to name but a few. Furthermore, it is desirable to embody the data handling arrangement in existing cable systems without the necessity and often considerable expense of installing additional cables throughout the entire system.

One conventional approach in CATV systems for acquiring data from subscribers is to equip each terminal point (i.e. television receiver or subscriber's home) with a transponder which, when addressed by a coded signal, transmits data back to the data retrieval equipment. This arrangement is commonly referred to as a time division system because the transponder is operating to transmit data only when it is addressed, and each transponder of the system is addressed for only a certain period of time. This time division approach is somewhat expensive in that each of the many terminal point transponders must have an RF receiver, logic decoder and logic encoder circuitry, and an RF transmitter. With large cable systems, the total cost of the transponder circuitry can be rather expensive.

Another approach to the problem is to use a so-called frequency division system in which each terminal point has equipment for sending the data back over a unique RF carrier. The RF carrier will thus give an identification of the terminal point from which the data is being transmitted. While this frequency division approach may be suitable for relatively small cable systems, it is not suitable for large ones. The reason for this lies in the fact that these return signal carriers will occupy such a large frequency spectrum that an excessive amount of cable bandwidth will be consumed. In fact, in many instances it would probably require the installation of an extra cable simply to accommodate these return signal carriers. For example, with 20 KC. of bandwidth per terminal and 5000 terminals, a cable bandwidth of 100 MC. would be used. This is, of course, uneconomical use of cable spectrum.

OBJECTS AND SUMMARY OF THE INVENTION

An object of the present invention is to provide a communications system for sending and receiving coded data which uniquely utilizes both frequency division and time division principles. This arrangement has the advantage of the frequency division system in that all of the terminal point data transmitters may be left active continuously without consuming excess cable bandwidth for return signal purposes. Therefore, it is possible to limit the return spectrum as is desired. The system of the present invention also has advantages over the time division system in that terminal point equipment costs are materially reduced since each terminal point does not need a receiver and an address decoder.

A further object of this invention is to provide a communications system of the type stated which can be readily embodied into existing CATV systems, both the single cable and the multiple cable type, and which can be used to transmit coded data from the terminal points in accordance with a variety of types of information such as channel monitoring, alarm indications, and the like.

It is a still further object of the present invention to provide a communications system of the type stated which embodies unique logic circuitry in both the terminal point equipment and in the data retrieving equipment. In accordance with this object the novel circuitry formats the data or message, provides a marker where the data stream or message begins, and provides synchronizing information for extracting the data. In one form of the invention a synchronous clock is used to determine when to sample the state of the incoming data. In another form of the invention the clock pulses and data pulses are encoded together to provide a time interval of blank or missing pulses that provides a message marker.

In accordance with the foregoing objects the system includes a plurality of data transmitting groups with each group comprising a predetermined number of discrete data transmitting means. Each group is represented by a predetermined interrogation code. Also provided are code-interrogation means for generating a code signal corresponding to a selected one of the interrogation codes representing a particular one of the transmitting groups. Also in the system are code-operated switch means associated with each of the data transmitting groups and so connected in the system that data from the data transmitting means of any group is prevented from reaching the data retrieval circuitry at the headend or other central location unless the switch means associated with that group is actuated by an interrogation code sent from the headend or elsewhere. Thus, while all data transmitters of all groups may be transmitting continuously, only the data from the group whose switch means has been activated will be sent to the data retrieval circuitry. Each data transmitting means of a particular group will send the data over the cable at a unique RF carrier which can be detected for identification purposes at the retrieval circuitry. However, since each group has a limited number of data transmitters, the cable bandwidth used for data transmission is relatively small. Moreover, this allows the data transmitting means of the other groups to use the same cable bandwidth for transmitting the data signals.

BRIEF DESCRIPTION OF THE DRAWINGS

FIG. 6 is a schematic block diagram of a home terminal transmitting unit which sends out data information to indicate a TV setting or condition in the home in which it is used;

FIG. 7 illustrates a series of data pulse trains superimposed with a series of clock pulses to develop a non-synchronous type of data pulse train in accordance with this invention;

FIG. 8 is a truth table which illustrates the operation of the circuit of FIG. 6;

FIG. 13 is a block diagram of the message marker detector of FIG. 10;

FIG. 14 is a truth table of the operation of the circuit of FIG. 13;

FIG. 15 is a circuit arrangement for the end of message detector of FIG. 10;

FIG. 16 is a showing of a shift register into which data information is stored after received in accordance with this invention;

DETAILED DESCRIPTION OF THE ILLUSTRATED EMBODIMENTS

Figure 1:
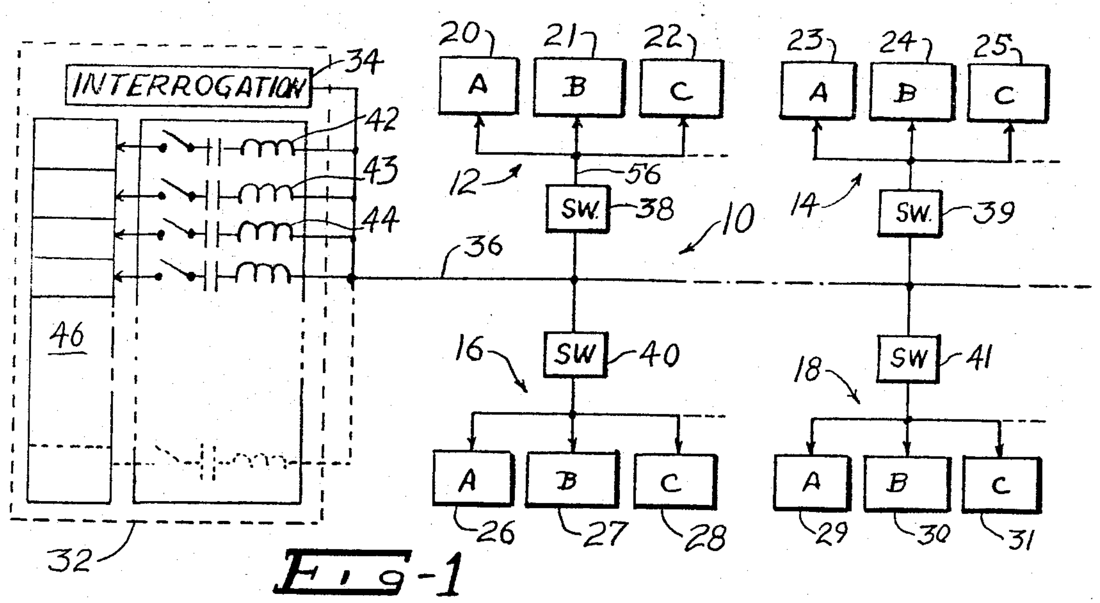
FIG. 1 is a schematic block diagram of a single cable transmission system in accordance with this invention.

Referring now to FIG. 1 a cable communications system constructed in accordance with this invention is designated generally by reference numeral 10 and includes a plurality of groups 12, 14, 16 and 18, etc., each including a plurality of data transmitting means. The data transmitting means may take forms other than that shown herein but is primarily of the type which converts the data or decimal number information into binary coded information to be transmitted over coaxial cables of the type used in CATV systems. Such systems usually, if not primarily, employ coaxial cable as the transmission medium; however, microwave lines and or multi conductor communications cables may be used in some parts of the system, if desired or necessary. In the contemplated use of the system 10 each discrete data transmitting means may represent a user's or subscribers's home and the data which is transmitted is derived from a television converter unit or other input means such as burglar alarm or fire alarm devices.

To maximize the number of individual homes from which data can be received, the system may be divided into discrete zones or areas, corresponding to groups 12, 14, 16 and 18, and each home in the area is assigned a fixed known frequency so that all data received on that frequency will be known to have come from that home. For example, group 12 may consist of a plurality of homes 20, 21, 22, etc., while group 14 consists of a plurality of homes 23, 24, 25, etc. In similar fashion group 16 includes homes 26, 27, 28, etc. while group 18 consists of homes 29, 30 and 31, etc. Since the groups of homes are distinct from one another, there can be similar frequencies assigned to homes of different groups. For example, homes 20, 23, 26 and 29 may be assigned a given frequency and thus designated by letter A. The other corresponding similar homes thus being designated by letters B and C. The data transmitting units 20–31, which also may correspond to homes, are designed for continuous operation and need not receive interrogating signals to transmit the data. That is, the data of each of the data transmitting units is continuously being transmitted, provided that the unit is turned on.

To receive the data from each of the groups, there is provided a retrieval unit designated generally be reference numeral 32 and which includes an interrogation circuit 34 to provide the necessary coded interrogation signal to gain access to the desired group of homes which is to be interrogated. The interrogation unit 34 sends a coded signal over a cable 36 which is connected in common with a plurality of code-operated switch devices 38, 39, 40 and 41, associated with groups 12, 14, 16 and 18, respectively. The coded information will activate one of the code-operated switch devices and simultaneously deactivate the other devices not corresponding to the coded signal. Therefore, since all of the data transmitting units 20–31 are continuously transmitting data, only the units within the particular group which is interrogated will transmit the signal information into the retrieval unit 32. Once the desired code-operated switch is activated, all of the data transmitting units simultaneously supply data to the cable 36 and into a plurality of tuned circuits, three of which are designated by reference numerals 42, 43 and 44 corresponding to data transmitting units A, B and C respectively. Therefore, the data from the transmitting unit 20, when code-operated switch 38 is actuated, will pass the tuned circuit 42 which is tuned to the same frequency as the frequency represented by letter A. On the other hand, should group 14 be the group interrogated, i.e., code-operated switch 39 actuated, transmitting unit 23 will have the code information thereof pass through the tuned circuit 42, and this coded information will be separated from the coded information of group 12 by the fact that a different interrogation code signal was used. Once the data signals from the data transmitting units pass the appropriate tuned circuits they enter storage and readout units designated generally be reference numeral 46.

Figure 2:
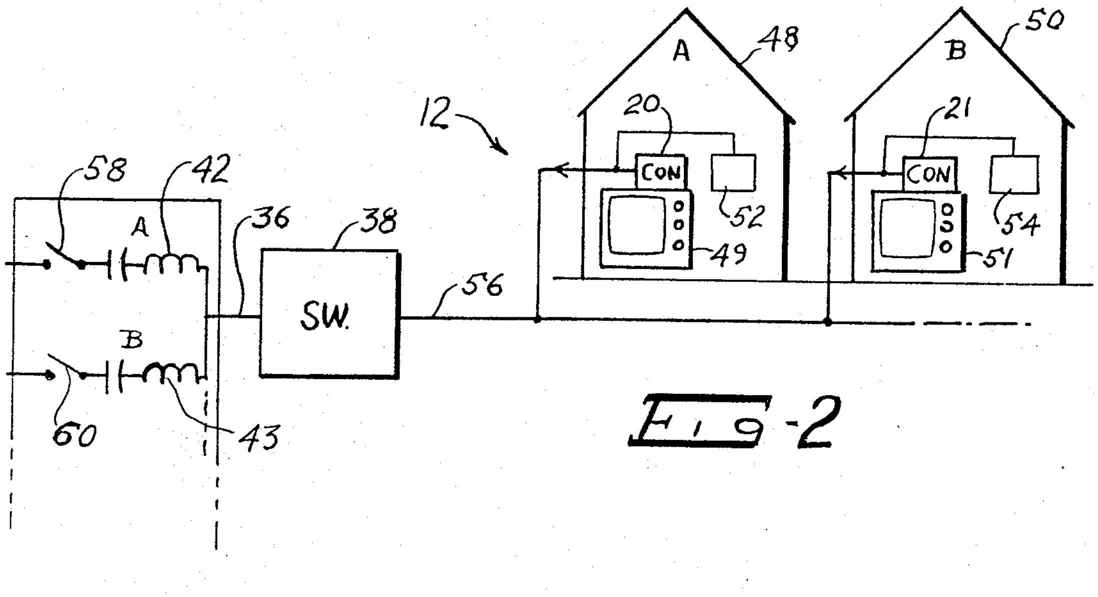
FIG. 2 is a more detailed showing of a fragmentary portion of the system of FIG. 1.

Referring to FIG. 2, there is shown two typical homes in which the data transmitting units can be used. Here the homes are designated by reference numerals 48 and 50 and wherein the data transmitting units 20 and 21 of group 12 are illustrated. The data transmitting units preferably are of the type which can take the form of a converter mounted on top of respective television sets 49, 51, or built directly into the television sets (e.g., ganged to the channel selector) to provide data information as to what channel the television set is tuned to or how long the television set is on any particular channel. Other data information can be injected into the signal information produced by the transmitting units 20 and 21 by use of encoding devices 52 and 54, respectively. This data information may take the form of fire alarm information, burglar alarm information, keyboard controlled message information, or any other data that are desired to be monitored at the headend wherever the retrieval unit 32 is located. For example, when the encoding devices 52 and 54 are keyboard controlled devices they can be used to make purchase selections from the home by pressing the appropriate keys to insert optional data into the system. One such type of keyboard arrangement to perform this function can be the NW class of keyboards provided by Micro switch. For example, the keyboard arrangements 12 NW 43-3, 16 NW 43-3, and 16 NW 47-1 can be used to perform the encoding functions of the devices 52 and 54. Therefore, when an advertisement on television is of merchandise which is desired to be purchased, the user merely operates the keyboard in accordance with a code which may be given during the television commercial thus effecting a purchase of the merchandise then being shown. However, means may be provided to purchase given merchandise at a later time after the advertisement. The data information is transmitted over a cable 56 into the code-operated switch unit 38 whereupon the signals of the appropriate frequency are divided through the tuned circuits 42, 43, 44 etc. The tuned circuits 42, 43, 44 etc. may selectively be scanned, one circuit at a time, by switches 58 and 60, or the tuned circuits may be scanned at random, as desired. Also, the tuned circuit may be free of all switch units and tied directly to the associated storage and readout unit 46.

When the cable transmission system of this invention is utilized as a television monitor arrangement, the application to pay-TV is greatly enhanced since the number of homes which can be monitored is greatly multiplied while not multiplying the cost or complexity of the system. This is brough about by the fact that only a single code-operated switch unit (e.g. 38, 40, etc.) need be used for each group 12, 14, etc. Therefore, a receiver and decoder logic network need only be provided once for each group rather than once for each home unit or for each data transmitting unit. In addition to determining which channel is set on a television set it also can measure the time during which the set is turned on any given channel. Thus, by continuous sequential monitoring of the system 10 by the retrieval unit 32, a continuous record can be made of what television sets are turned on what channels and how long they are on.

Figure 3:
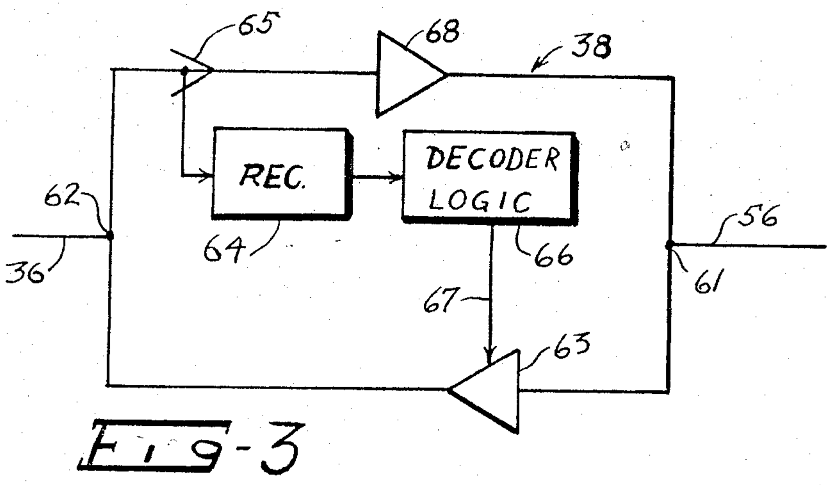
FIG. 3 is a schematic block diagram of a code-operated switch amplifier circuit used in conjunction with this invention.

Referring now to FIG. 3, a simplified block diagram of a code-operated switch unit is illustrated, the switch unit 38 being typical of all such switch units in the system. Since the communications system optimizes the use of the frequency spectrum in a given cable system, the cable can be used for transmission of signals in both directions with suitable separation between the signals, and only a single switching unit need be inserted into the cable of a particular group, as shown in FIG. 1. The data transmitting units 20, 21 and 22, etc. of FIGS. 1 and 2 are continuously applying a signal information over cable 56 to an input terminal 61, but none of this signal information normally passes through the code-operated switch unit 38. The input signals at terminal 61 do not reach the output terminal 62 until such time as a reverse amplifier 63 is rendered operative. The reverse amplifier 63 is a band pass amplifier and is switched on or made operative in response to receiving a coded signal at a receiver 64 which, in turn, applies the coded signal to a decoder logic circuit 66. The signal passes through a directional tapoff 65 prior to entering either the receiver 64 or the amplifier 68. The decoder logic circuit then produces a signal over a line 67 to activate the reverse amplifier 63. The code-operated switch 38 may include a forward amplifier 68 which is also a band pass amplifier and passes the coded interrogation signal, as well as other signal information, along the line 56 if it is desired to activate other decoder logic means to interrogate still other zones of the system. That is, each of the groups 12, 14, 16 and 18 may be divided into further sub-groups as desired.

The receiver 64 may be of known circuit configuration. By way of example, the receiver 64 may be tuned to a particular known RF and provide a demodulated output to the logic 66, which demodulated output is the coded signal for the logic 66. The coded signal may be of any suitable known characteristic that activates the logic 66 to provide a signal output on line 67.

Figure 4:
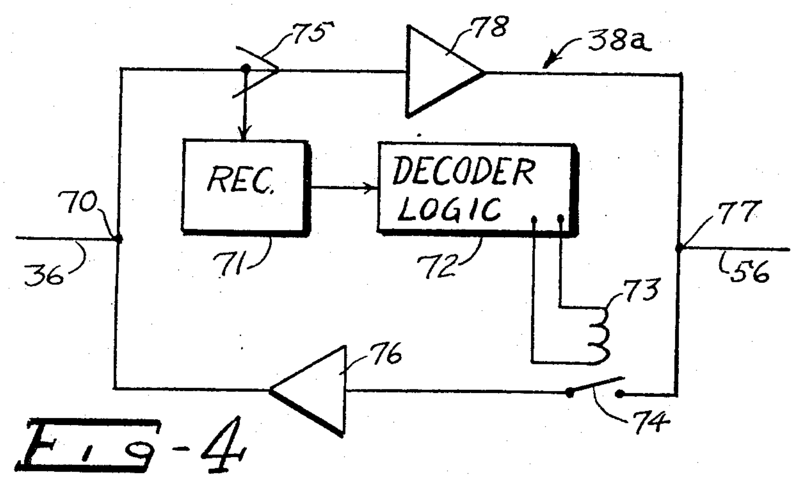
FIG. 4 is an alternate arrangement of a code-operated switch amplifier circuit as shown in FIG. 3.

FIG. 4 illustrates an alternate embodiment of the code-operated switch and is designated generally by reference numeral 38*a*. Here the switch 38*a* receives a coded signal at terminal 70 which, in turn, passes through a directional tapoff and a receiver unit 71 and therefrom to a decoder logic circuit 72. The decoder logic circuit 72 is connected to a relay device 73, of any suitable kind, which operates a switch member 74 connected in series witwith a reverse amplifier 76. Therefore, the incoming signals at terminal 77, from the continuously operated data transmitting units, will now pass through the amplifier 76 and into the cable portion 36. Here also a forward amplifier 78 is shown and can be used as described above for transmitting the code information, or other signal information, further along the cable 56.

Figure 5:
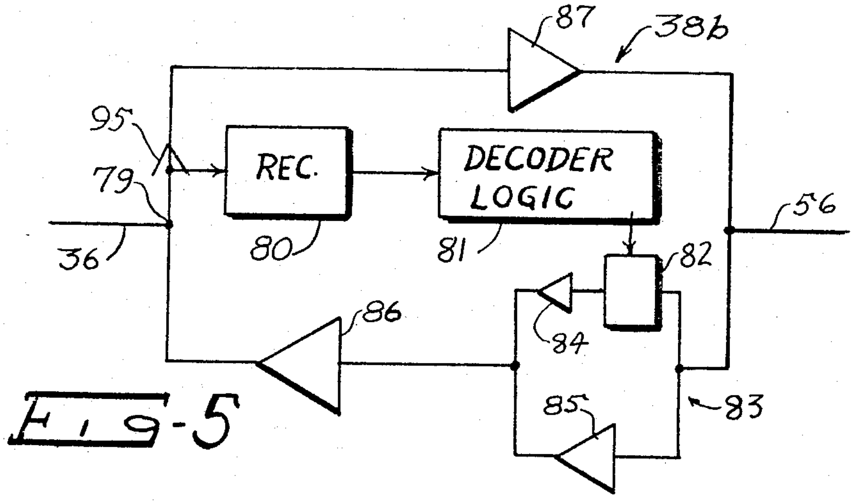
FIG. 5 is still another alternate showing of a code-operated switch amplifier circuit in accordance with this invention.

Referring now to FIG. 5, still another embodiment of the code-operated switch is shown, it being designated generally by reference numeral 38*b*. Here the input signal is applied to a terminal 79 and therefrom through a directional tapoff 95 to a receiver 80 and to a decoder logic circuit 81. The logic circuit 81 is connected to a switch-operated circuit 82 which is in one leg of a bandsplitter network 83 comprising a pair of bandpass amplifiers 84 and 85. The bandpass amplifiers have their outputs connected to a reverse amplifier 86. In this instance, the code-operated switch may pass certain signals at all times in the reverse direction through the amplifier 85 while other signals pass through the amplifier 84 only upon actuation of the switching circuit 82. Therefore, the code-operated switch 38*b* can serve double duty as a selective and as a continuous monitoring network. Here also a forward amplifier 87 is used to transmit the code signal information along the line 56 as desired. It will be noted that bandsplitter filters may be used at circuit points 61, 62, 70 and 77 if desired.

Referring now to FIG. 6, a detailed block diagram of a typical data transmitting unit is shown and designated by reference numeral 20 thus corresponding to the data transmitting unit of FIGS. 1 and 2. The parallel binary storage and parallel-to-series conversion of data is accomplished by integrated circuits of a commercially available type but which are connected in a unique manner to provide the new cooperation between such circuits. For example, a data selector and multiplex integrated circuit unit 90 may be of the type supplied by Texas Instruments Incorporated and referred to by their part No. SN74150. In addition, a four bit binary counter 92 is used. This may be of the type supplied by Texas Instruments Incorporated and designated by their part No. SN7493. Similarly, commercially available integrated circuit components forming diode logic or transistor logic are used to form a clock oscillator circuit 94 and part of the integrated circuit is used for an exclusive OR gate output 96. Any suitable modulator and RF transmitting means 98 of known type may be used. An input switch 100 is herein shown as a rotary selector switch corresponding to the rotary function of a channel selector on a television set and includes a plurality of outputs which are connected to a corresponding plurality of input leads to the multiplex circuit 90 for inserting data therein. While a rotary switch is shown herein, it will be understood that other suitable decimal conversion binary switches can be used, for example, a thumb wheel switch, or the like. Other switch devices for other types of data input may be used to provide a binary input to the circuit 90.

In the form of the invention shown, the multiplex circuit 90 preferably has sixteen input leads, three of which are utilized in a novel manner to provide a message marker indication in the data pulse train. The remaining thirteen inputs will correspond to the thirteen channel inputs of a television set, this being channels 2 to 13 with No. 1 input corresponding to the UHF channel selection. The multiplex unit 90 has a four input arrangement designated by reference numerals 101, 102, 103, and 104, connected to corresponding output terminals of the four bit binary counter 92. The output terminals here are designated 1, 2, 4, and 8, this corresponding to the binary logic of the circuit. The four bit binary counter 92 has an input lead 106 connected to an output lead 107 of the clock oscillator circuit 94, the lead 106 also being connected to input leads numbered 13, 14 and 15 of the multiplex circuit 90. Therefore, the data applied to these input leads corresponds only to clock pulses and therefore will produce cancellation of pulses within the pulse data train. This cancellation of pulses will exist for a predetermined period of time and will thus provide a message marker. The clock oscillator 94 is comprises of a pair of cross-coupled gate logic circuits 108 and 109 having the outputs thereof connected back to one of the inputs through a corresponding pair of capacitors 110 and 111. The other inputs to the gate logic circuits are connected to ground potential through resistors 112 and 113. The pulse train output of the oscillator circuit 94 is illustrated at 115 in FIG. 7. The pulse train produces continuous output pulses so long as the data transmitting unit is turned on, and the four bit binary counter 92 is cyclically operated by counting 0 through 16 in binary fashion in repeated sequence. The input to terminals 101, 102, 103 and 104 thus shifts the parallel stored information in the multiplex unit 90 into a series data output designated by the pulse train 116, FIG. 7, and this data pulse train is applied to the input line 117 of the exclusive OR gate 96. Within the exclusive OR gate 96 the data pulse train 116 and the clock pulse train 115 are combined to produce a composite output pulse train 118 (FIG. 7) along the output line 119. This composite output data pulse train is then fed into the modulator and RF transmitter unit 98 for transmission along the cable. The RF is, of course, unique for the subscriber (or possibly the TV receiver itself) for the zone or group 12.

FIG. 8 illustrates a truth table of the data transmitting circuit 20, the truth table corresponding to the input and output functions of the exclusive OR gate 96. The data pulse train 116 is illustrated under a data column and whenever a data bit is 0 and a corresponding clock time is 0 (corresponding to the space between clock pulses), the combined output is 0. However, with a 0 data bit combined with a clock pulse an output pulse will be produced, this being represented by the pulses 120 shown for purposes of illustration as being interleaved between actual data pulses. The interleaved pulses 120 are of a much less time duration than the data pulses, but may be of a greater time duration if desired. On the other hand, when a data pulse is provided along with a clock pulse, the corresponding output of the exclusive OR gate 96 is 0, this then providing serrations 121 (FIG. 7) along continuous data pulses to separate the data pulses. Thus, for each of the first three inputs to the multiplex unit 90 there is a binary bit registered. They will produce three corresponding binary output pulses 122 which are separated by the serrations 121. To indicate the end of message or to provide a message marker, the last three inputs of the multiplex unit 90 are connected directly to the clock circuit 94 to receive pulses therefrom, these pulses inverted by multiplex unit 90 thus corresponding to short time duration data pulses in exact sequence with the inverted output pulses applied to the exclusive OR gate 96 from the clock circuit 94. Therefore, in accordance with the truth table in FIG. 8, a logical 1 output in the data stream and a logical 1 clock pulse will produce a 0 composite signal. Since the data pulse is of the same time duration as the clock pulse, the net effect is an elimination of pulse information for a predetermined time interval as indicated by reference numeral 123 and consequently a message marker.

Figure 9:
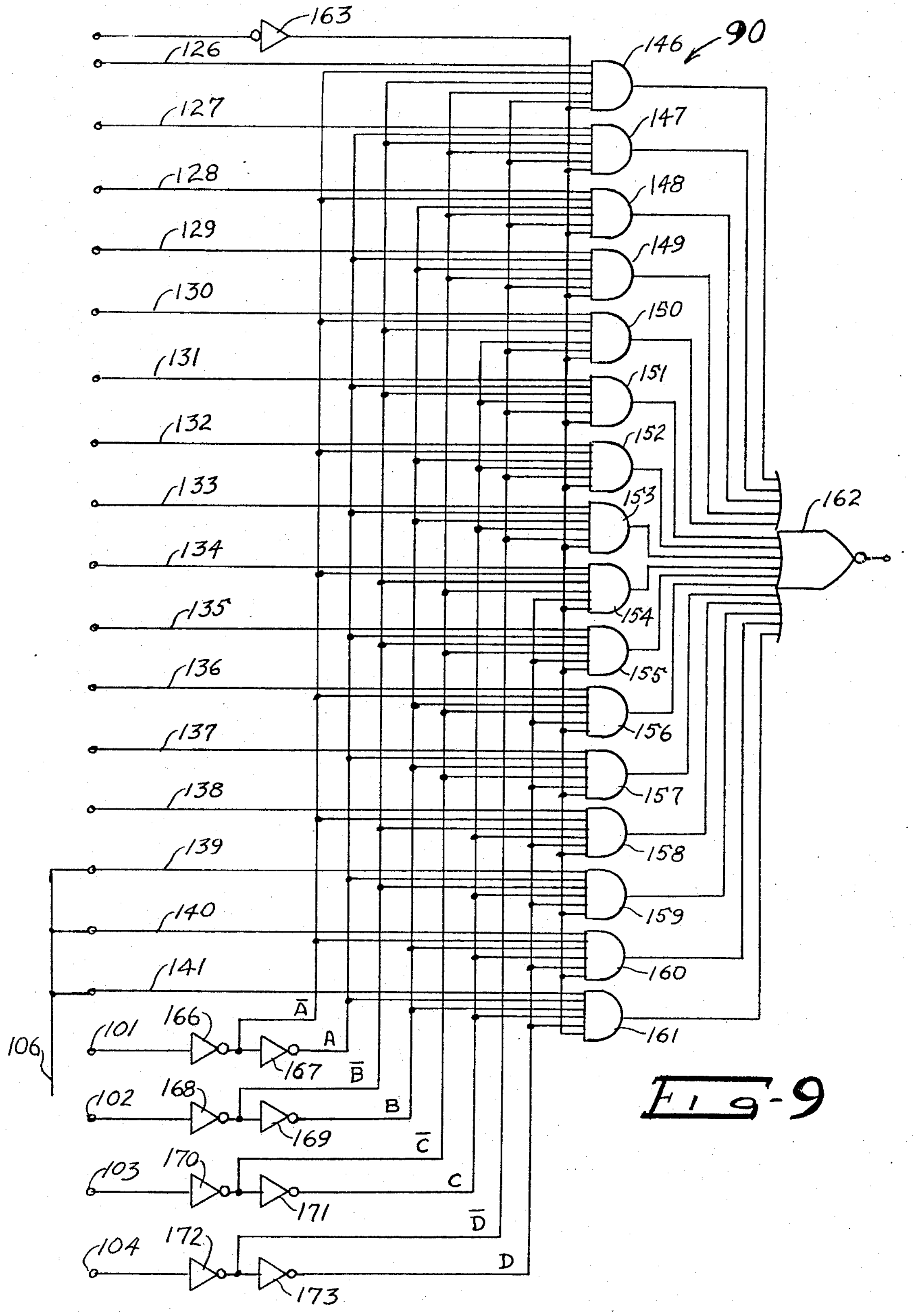
FIG. 9 is a schematic of the data storage and parallel-to-series converter circuit of FIG. 6.

For a better understanding of the data storage of parallel to series conversion as set forth in FIG. 6, the multiplex integrated circuit 90 is shown in greater detail in FIG. 9, with the appropriate logic circuit being indicated to understand its operation. A plurality of input lines 126–138 are arranged for connection to suitable data input means such as the thirteen terminal rotary switch 100 of FIG. 6. The input line 126 may, for example, correspond to the UHF channel of a television receiver while second, third and fourth lines and so on will correspond to channels 2, 3 and 4, etc., respectively. However, input lines 139, 140 and 141 are connected to the clock output lead 106 (FIG. 6), as mentioned above, and the only data received are clock pulses and are of the same time duration. A total of 16 AND gate circuits 146–161 are provided and all have their output leads connected to a corresponding one of the inputs of an OR gate circuit 162. The AND gate circuits 146–161 are of the six input type and are sequentially triggered to an "on" state to pass the data information which happens to be on the input lines 126–141. Since the circuit of this invention is designed for continuous operation, the strobe or enable circuit 163 of the multiplex unit 90 is rendered continuously operative and thus the sixth input to all of the AND gates are provided with an appropriate pulse. To obtain a data pulse from the AND gate circuit 146, there need be no input pulse at the terminals 101, 102, 103 or 104 since these terminals are connected to similarly connected series inverter circuits 166-173. For example, inverter circuit 166 has its output connected to inverter circuit 167 and the output of each of the inverter circuits are connected to the corresponding AND gate circuits 146 and 147. The output of the inverter circuit 166 is indicated by $\overline{A}$ with the output lead $\overline{A}$ connected to a second input of AND circuit 146. Similarly, the outputs $\overline{B}$ and $\overline{C}$ and $\overline{D}$ of the inverter circuits 168, 170 and 172, respectively, are connected to the remaining input terminals of AND gate 146 and thereby this AND gate is rendered open to pass the data information on line 126 without a pulse applied to the sequencing terminals 101-104.

With a state 1 on terminal 101 the state of inverters 166 and 167 reverse and an input signal along the $\overline{A}$ line will be applied to AND gate 147. However, the $\overline{B}$, $\overline{C}$ and $\overline{D}$ lines are also connected to AND gate 147 and thus any data information on line 127 will be transmitted to the input of the NOR gate 162 and therefrom to the modulator and RF transmitter 98 through the exclusive OR gate 96 (FIG. 6). A state 1 at input terminal 102 will cause the $\overline{B}$ line to produce an input to the AND gate 148 while other input terminals of AND gate 148 receive signals from $\overline{A}$, $\overline{C}$ and $\overline{D}$ thus providing an output signal corresponding to the data on input line 128. The operation of the remaining AND gates 149–161 is substantially the same with the exception that AND gates 159, 160 and 161 receive data pulses from the clock pulse generator over line 106 and therefore the data bits produced at their outputs are of the same time duration as the clock pulses. Therefore, when the short data bit is combined with the clock pulse at the NOR gate 96 the result is a complete cancellation of output pulse information for a predetermined period of time, thus forming the message marker.

Figure 10:
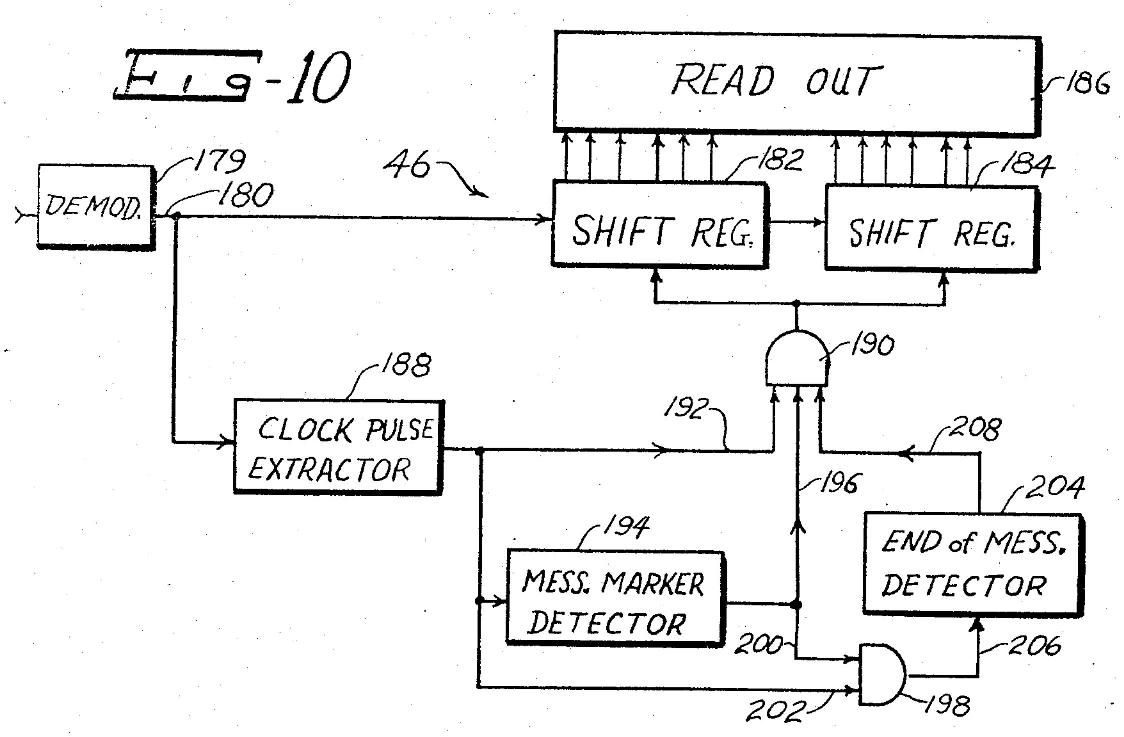
FIG. 10 is a block diagram showing the basic structure for data retrieval at the headend of the system which generates clock pulses in accordance with this invention thereby eliminating the need of sending synchronizing pulses.

To receive and decode the composite pulse signal data 120, 122 and the message marker space 123, FIG. 7, the data retrieval and readout circuits 46 are used, one of such circuits being typically illustrated in FIG. 10. The modulated RF from the circuit 98 (FIG. 6) is sent over the cable and after passing through the demodulator 179, the selected data are received over a line 180. The demodulator 179 forms part of each tuned circuit 42, etc., earlier described. The data are then delivered to the input of a first shift register 182 which, in turn, has an output connected to a second shift register 184. Shift registers 182 and 184 will produce digital readout or recording of information of two digits between 00 and 99 in a readout unit 186. The composite pulse signal over line 180 is also delivered to a clock pulse extractor network 188 which produces uniformly spaced clock pulses without the need of synchronization. That is, the clock pulses and data pulses of FIG. 7 will produce the same type of clock pulse output at one of the inputs of an AND gate 190 which is delivered thereto over a line 192.

A message marker detector 194 also receives the train of clock pulses from the clock pulse extractor 188. The message marker detector has a state 0 or low output while receiving the clock pulses. However, upon sensing the message marker space 123 (FIG. 7), the output of the message marker will go to one or a high level and apply this state 1 signal over a line 196 to a second input of the AND gate 190. Now clock pulses existing after the message marker space 123 will be delivered through the AND gate 190 to the shift reigster since the third input 208 of the AND gate 190 is already in a high state.

To disable the shift register circuits 182 and 184 the AND gate 190 is disabled by an end of message detector 204 which has a normally high output thereof connected over the line 208. The input of the end of message detector 204 is connected to an AND gate 198 which, in turn, has a pair of inputs 200, 202 connected to the message marker detector 194 and the clock pulse extractor 188.

In operation, the end of message marker will maintain the third input 208 of AND gate 190 in a high state. AND gate 198 is enabled when the output of the message marker detector 194 goes high and the clock pulses from the clock pulse extractor 188 are delivered through the AND gate 198 and into the end of message detector. Once enabled the end of message detector is a counter which will count the basic message block number, here being a count of 14, and at the end of the count will cause line 208 to go low, thereby disabling AND gate 190 to lock in the shift registers 182 and 184 at their present readings. The circuit 204 may also provide a transfer signal which will shift the data information into the readout unit 186.

Figure 11:
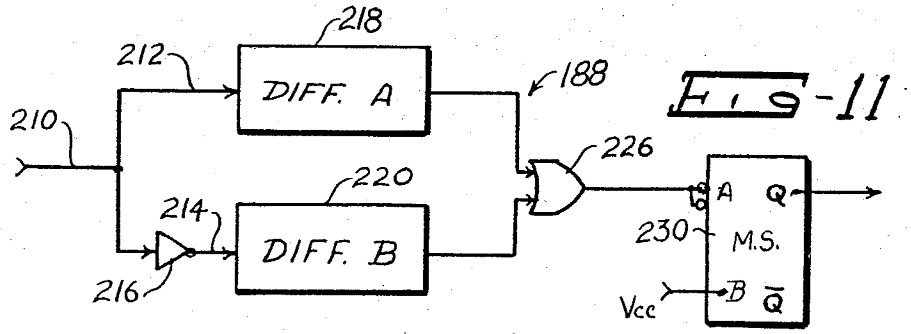
FIG. 11 is a detailed block diagram of the clock pulse extractor of FIG. 10.

For a better understanding of the circuits associated with the block diagram of FIG. 10, reference is now made to FIGS. 11, 12, 13, 14, 15 and 16 which illustrate in detail the basic logic circuits associated therewith. For example, FIG. 11 is a clock pulse extractor logic which has an input line 210 divided into a standard input 212 and an inverted input 214 from an inverter circuit 216. Both the standard and inverted inputs are fed through associated differentiators 218 and 220, they being further identified as A and B, respectively.

Figure 12:
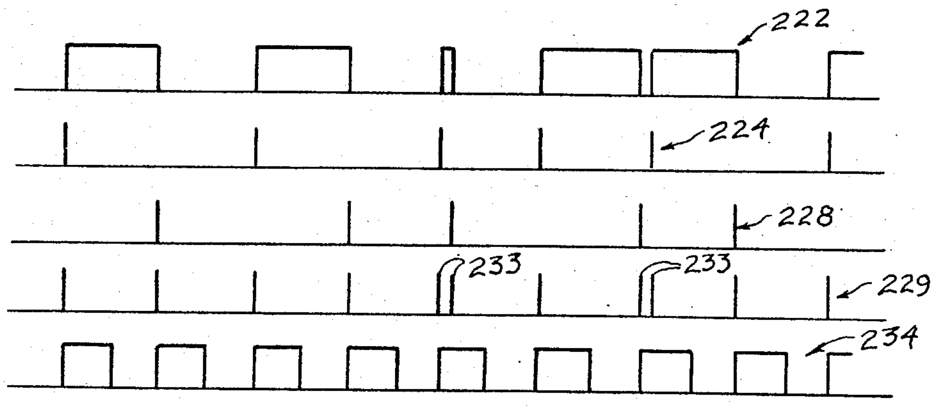
FIG. 12 is a series of wave forms illustrating the operation of the clock pulse extractor of FIG. 11

FIG. 12 illustrates a portion of the composite data signal received over line 180. This composite data signal is designated by reference numeral 222. Each pulse, both data and clock pulse information, on its rising slope will produce a corresponding spike or short time duration pulse 224 through the differentiator 218 which is applied through an OR gate 226. Similarly, the inverted output from line 214 passes through the differentiator 220 and produces a spike or short time duration pulse 228 which is also applied through the OR gate 226. The combined pulses 224 and 228 passing through the OR gate 226 are delivered to a monostable circuit 230 which has a time duration equal to one-half the period of an average clock pulse period initially generated at the home terminal. It will be noted that the time duration of the monostable circuit 230 is sufficient to eradicate second formed closely spaced pulses 233 which may be caused either by a lone clock pulse or by closely spaced data pulses. The output of the monostable circuit 230 is uniformly spaced clock pulses 234 which, as mentioned above, are delivered both to the AND gate 190 and to the message marker detector 194.

The logic circuit arrangement of the message marker detector 194, shown in FIG. 13, receives a train of clock pulses over a line 240 which are applied to a clock input 242 of a flip-flop circuit 244 and to a switching input of a monostable circuit 246 which is a retriggerable monstable circuit. In the initial clear condition the state of the outputs of the flip-flop 244 and monostable circuit 246 are shown by the truth table of FIG. 14 with the 1 and 0 row being designated by reference numeral 248. Upon receiving the first clock pulse the state of flip-flop 244 is changed to provide a 1 or high pulse along an input line 248 of an AND gate 250. On the other hand, the $\overline{Q}$ output of monostable circuit 246 is now at 0 and applied to the input of the AND gate along a line 252. This will not provide an output from the AND gate, and a flip-flop circuit 254 will have the Q output thereof in a low condition, this being indicated on the truth table of FIG. 14 by the row 256. However, the time duration of monostable circuit 246 is greater than the time duration between clock pulses 234 and will revert its state so that $\overline{Q}$ output along line 252 is now 1. The output of AND gate 250 will trigger flip-flop 254 via its clock input to produce a 1 output form its Q terminal. This is the positive signal applied over line 196 of FIG. 10. This change of state of flip-flop 254 and the states of the circuit logics are now shown by row 258 of FIG. 14.

Referring to FIG. 15, the output of the message marker 194 and the clock pulse extractor 188 are delivered to the AND gate 198, and the end of message detector is set into operation by a train of clock pulses applied thereto over a line 260. The output of the end of message marker 204 is initially high as the result of an inverter stage 262 which applies the 1 pulse to the AND gate 190 (FIG. 10) over the line 208. A reset line 264 is used to reset a counter circuit 266 when the data has been read out of the readout unit 186 of FIG. 10. The end of message marker includes an AND gate 266 which has one inout thereof connected to the output of the inverter 262 and is normally in a 1 state. Therefore, input signals over line 260 will pass through the AND gate and begin operation of the counter circuit 266. Outputs numbered 2, 4 and 8 of the binary logic circuit of the counter 266 are tied to an AND gate 268 which, in turn, has its output connected to the inverter 262. Therefore, upon reaching a count of 14 the binary outputs 2, 4 and 8 are high and will produce a pulse through the AND gate 268. However, this pulse is inverted and line 208 will go low to disable the AND gate 190 of FIG. 10. Once reaching the count of fourteen the AND gate 266, via the input connected to inverter 262, it disabled to prevent further clock pulses from passing therethrough, thus preventing the shift registers 182 and 184 from receiving further clock or shift pulses.

FIG. 16 illustrates a portion of a typical shift register 182, it being understood that shift registers 182 and 184 are substantially similar. In this instance, the shift register 182 includes a plurality of JK flip-flops 270, 272, 274, etc., which have their inputs connected to the output of the previous flip-flop. The input to the shift register 182 is over the line 180 and is also applied to an inverter 276 so that both inputs of the first flip-flop are triggered. The clock pulse to the shift register is applied over a line 278, this clock pulse being enabled only when the output of AND gate 190 is high.

Once the data pulse train is received and processed through the various circuit arrangements as illustrated above, it can be stored or readout by the readout unit 186 to obtain an indication of the channel a viewer is watching or an indication of some other condition in a subscriber's home, such as a burglar alarm or fire indication.

Figure 17:
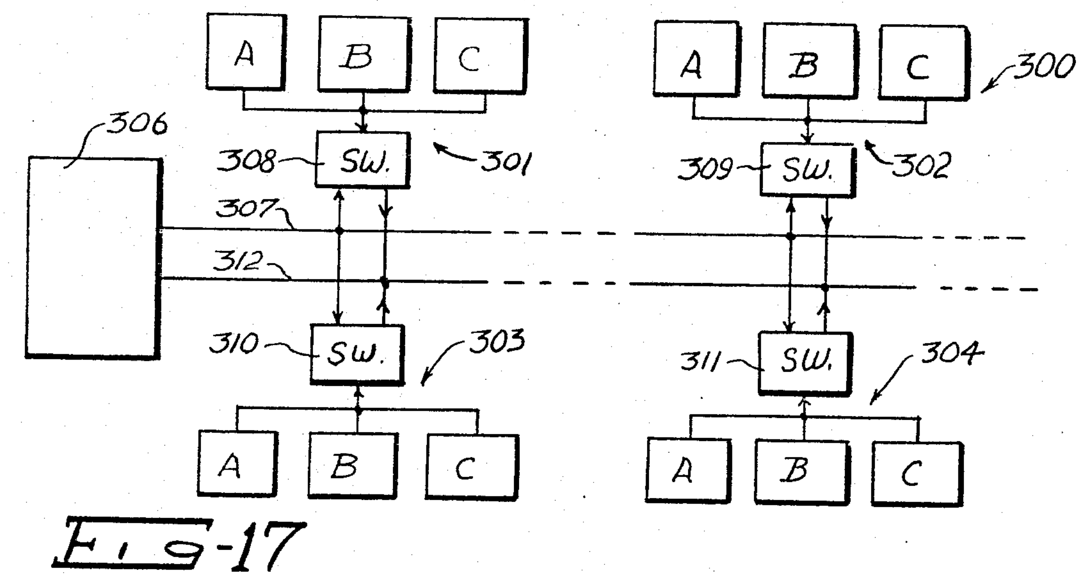
FIG. 17 is a block diagram of a two cable transmission system constructed in accordance with this invention.

Referring now to FIG. 17, a two cable system is illustrated and designated generally by reference numeral 300. The data transmission 300 includes a plurality of groups of home terminals 301, 302, 303 and 304, each containing home terminals identified as A, B and C. Each of the home terminals in a given group operates on a different transmission frequency and, as mentioned above with respect to the single cable system, each frequency can be duplicated in the other groups. Access to each of the groups 301–304 is obtained by a coded interrogation signal developed by an interrogator and retrieval network 306 which delivers a signal over an outgoing cable or line 307 first terminal to each of a plurality of amplifier switch networks 308, 309, 310 and 311, respectively, they having coded circuits which enable the turn signal flow from the properly addressed group. The group which has been addressed will supply return signals back through a second terminal of the associated switch network to a second cable 312 and back to the interrogation and retrieval network 306. The data transmission system 300 therefore utilizes the combination of frequency division and time division as set forth above with regard to the system of FIG. 1. However, by utilizing a two cable system the frequency spectrum is enhanced and the possibility of cross talk between frequencies or channels within a given cable is substantially reduced. Furthermore, a two cable system further increases the number of groups that can be incorporated into the frequency and time division system.

Figure 18:
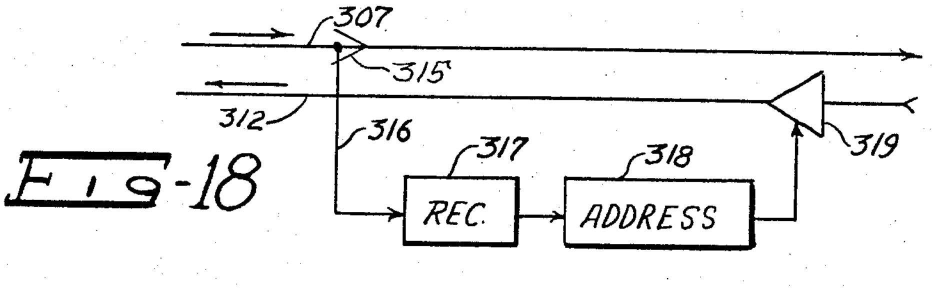
FIG. 18 is a block diagram of a code-operated switch amplifier circuit used in conjunction with the two cable system of FIG. 17.

Referring now to FIG. 18, an amplifier switching network suitable for use in the system 300 is shown. This is a typical arrangement and can be of the type used for the switches 308–311. Here the interrogation line 307 is connected to an input line 316 which, in turn, is connected to a receiver 317 for purposes of amplification or the like. This data is in the form of an address code and interrogates an address decoder logic circuit 318 of previously coded characteristic, and upon proper address thereof will enable a return amplifier circuit 319 to pass the continuous output of the home terminals A, B and C of the particular group then being interrogated. The return signal through amplifier 319 is passed along the return line 312 as mentioned above. The bandwidth spectrum for the system is thus increased since the bandwidth for the forward line 307 does not include the return signal or signals which pass along line 312.

Figure 19:
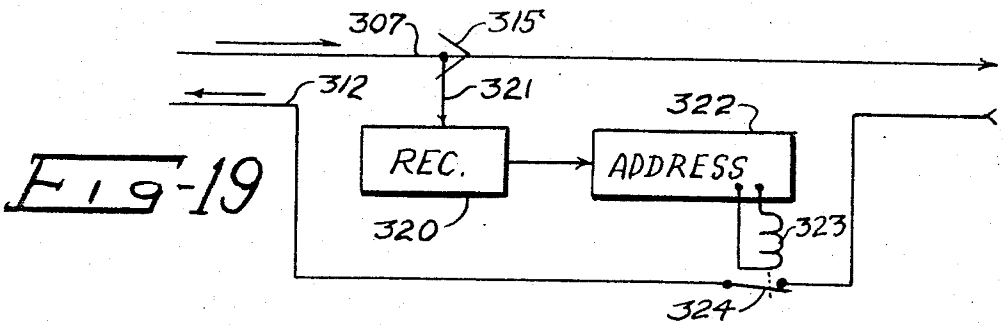
FIG. 19 is an alternate arrangement of a switch amplifier circuit of FIG. 18.

A modified switching network is shown in FIG. 19 and has a receiver 320 connected to the forward line 307 via an input line 321. Upon proper reception and amplification of this address signal, an address decoder logic circuit 322 is energized to actuate a relay 323 and close the circuit for the return line 312 by a movable switch member 324. This then enables a return of a frequency spectrum of all the home terminals in the particular group being interrogated.

Figure 20:
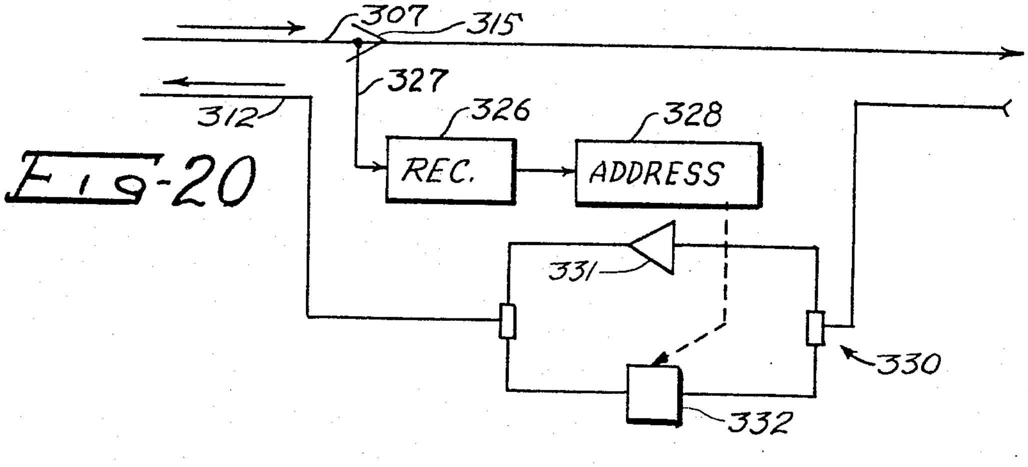
FIG. 20 is still another alternate arrangement of a switch amplifier circuit of this invention.

FIG. 20 illustrates still another switching and amplifying circuit arrangement which can be used for any one of the switch devices of FIG. 17. Here the forward line 307 is connected to a receiver 326 via a line 327 and the output of the receiver is connected to an address decoder logic circuit 328 to enable one-half of a bandsplitter combination circuit 330. The bandsplitter circuit includes a continuously enabled return amplifier 331 and a switchably enabled return amplifier 332. Therefore, return signals of one frequency or within a given band of frequencies will pass through the amplifier 331 while only those signals which are of a particular frequency will pass through the enabling amplifier 332.

Figure 21:
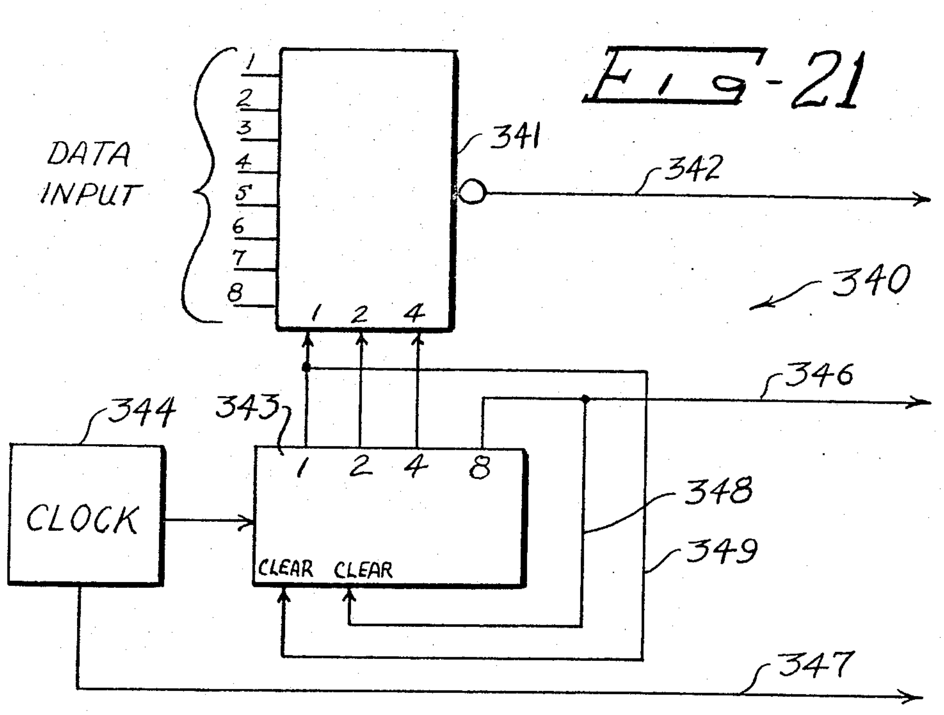
FIG. 21 is a block diagram of a home terminal data encoder of novel construction in accordance with this invention.

Referring now to FIG. 21 a home terminal data encoder is illustrated and designated generally by reference numeral 340. The data encoder 340 is useful for a two cable system, but it being understood that a single cable system can incorprate this novel encoding circuit arrangement. Here an eight bit parallel-input data storage circuit 341 is utilized, it being substantially similar to the sixteen bit data storage network 90 of FIG. 9. As in the previously described embodiment, the data input can be from suitable switch means correlated to channel selection, alarm detectors, or keyboard switches to send back messages from subscribers. Because only eight bits of data are obtainable in a series output from the storage network 341, message marker means are provided by a novel circuit arrangement to conserve on data input terminals.

The data output from the circuit 341 is in serial form and delivered over a line 342 to the cable system and ultimately therefrom to the retrieval circuit 306 of FIG. 17. The sequencing of the storage circuit 341 is achieved by a four step binary counter 343 which includes a four terminal output representing the indicated binary numbers 1, 2, 4 and 8, this four step counter being controlled by a clock circuit 344. It will be understood that the clock circuit 344 can take the form of a sixty cycle power line frequency, or a one hundred twenty cycle line when full wave rectification is utilized, or any other stable frequency desired. The output of the four step counter 343 from the binary eight terminal is utilized as the message marker output and is applied to a line 346 to indicate the beginning and end of a series of data pulses. The clock pulses from clock circuit 344 are also applied to a line 347 to synchronize the retrieval circuit. However, line 347 is illustrated for purposes of clarity and this line may take the form of the conventional power lines when utilizing the 60 cycle or 120 cycle frequency for clock pulses.

In operation, zero output from binary terminals numbered 1, 2 and 4 will produce data output on line 342 resulting from the data input at the number 1 terminal of the storage network 341. Binary counting from terminals numbered 1, 2 and 4 of counter 343 will sequentially produce outputs on line 342 resulting from data inputs on terminals 2, 3, 4 etc. of the data storage network 341. However, upon reaching the binary count of 8 with the binary 8 terminal high a ninth pulse will be produced over line 346 and this ninth pulse will comprise the message marker output. When both the terminal No. 1 and terminal No. 8 of counter 343 are high, i.e., producing a momentary tenth count, a pair of reset lines 348 and 349 will immediately reset the entire counter 343 to a zero condition to repeat the cycle of operation. Therefore, nine output pulses, one being the message marker output, are produced by utilizing an eight input storage circuit 341. Thus, none of the terminals of the circuit 341 are sacrificed to provide a message marker.

Figure 22:
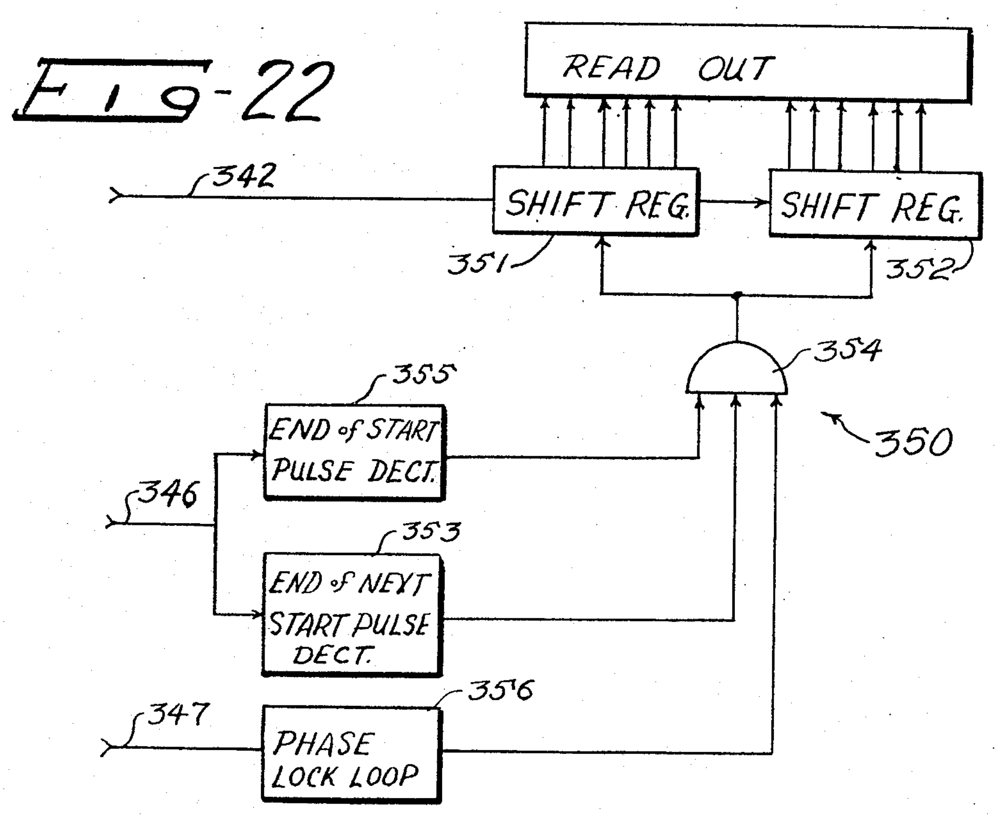
FIG. 22 is a block diagram of a data retrieval system for receiving the data of the encoder of FIG. 21 and producing readout data therefrom.

The signals produced by the data encoder of FIG. 21 are then delivered via circuits such as 98 (FIG. 6) and 179 (FIG. 10) to the data retrieval circuit 350 of FIG. 22. The data pulse train applied over line 342 is delivered to the input of a shift register 351 which, in turn, has an output connected to an input of a second shift register 352. The message marker pulse applied to line 346 is delivered in parallel fashion to an end of start pulse detector 355 and to an end of next start pulse detector 353, they both having an output connected to an AND gate 354. The clock pulse is applied over line 347 and to a conventional phase lock loop circuit 356 so that the phase of the pulse, when utilizing the standard sixty cycle line, is in synchronization between the home terminal and the retrieval station. The output of the end of start pulse detector 355 is at all times high during the time interval between data pulses, but when a short interval message marker pulse is received, the AND gate 354 is disabled by a zero condition at the output of the end of start pulse detector. On the other hand, the end of next start pulse detector 356 can be a counting network which has a high output for eight counts and upon sensing the ninth count the AND gate 354 is disabled. All operation of the circuit is in synchronization with the phase lock loop circuit 356 which has an output also connected to the AND gate 354 which controls enabling and disabling of the shift registers 351 and 352.

The end of start pulse detector 355 is somewhat similar to the message marker detector 194 and the end of next start pulse is somewhat similar to the end of message detector 204. The primary difference between these corresponding circuits is time duration and the number of pulses counted.

Also, this invention can be used in apartment buildings or apartment complexes where communications from the many apartments to a central point is desired. The standard 117 AC voltage line (house wiring) would be used to transmit very low RF frequencies. These signals would not pass through power distribution (step down) transformers. So, at these locations addressable switches would be provided to selectively relay signals from various buildings of a complex to a central point (assuming each building had a separate power transformer). Within buildings the house wiring would be used; between buildings coaxial cable might be used.

While several embodiments of this invention have been shown it will be understood that variations and modifications may be effected without departing from the spirit and scope of the novel concepts disclosed and claimed herein.

The invention is claimed as follows:

1. In a communication system for sending and receiving data, the combination including, a plurality of data transmitting groups, each group comprising a predetermined number of discrete data transmitting means adapted for data transmission, and each group being represented by a predetermined interrogation code, code- interrogation means for generating a code signal corresponding to a selected one of the interrogation codes representing a particular one of said groups, code-operated switch means coupled between said code interrogation means and each of said data transmitting groups, each switch means having a first terminal in communicative connection with said code-interrogation means and a second terminal in communicative connection with each of said discrete data transmitting means of its associated group, said code-operated switch means having means providing a normally open return circuit between said code-interrogation means and said transmitting means of its associated group for blocking the transmission of data from said discrete data transmission means of the group unless the code signal at said first terminal of the associated code-operated switch means corresponds to said appropriate interrogation code, thereby to close said return circuit for passage therethrough of data from all operating data transmitting means of the interrogated group, and data retrieval means in communicative connection with said code-operated switch means to receive data signals from the discrete data transmitting means of the group which has been interrogated.

2. A system of claim 1 wherein each of said discrete data transmitting means within each group is identified by a discrete frequency and said retrieving means includes frequency selective means including frequency selective circuits corresponding in number to said discrete data transmitting means so that data information is received only by the appropriate circuit.

3. A system of claim 1 wherein said communicative connections include coaxial cable means.

4. A system of claim 1 wherein each of said discrete transmitting means includes switch means to insert data into parallel binary storage means, parallel-to-serial converter means for receiving the binary data, a clock pulse generator for controlling the sequence of operation of said parallel-to-serial converter, said clock pulse generator having an output connected to a predetermined number of input terminals of said parallel-to-serial converter such that the data pulse train produced by said parallel-to-serial converter will have a predetermined time interval of blanked pulses to provide a message marker along with said data pulse train, and RF transmitting means for receiving said data pulse train and transmitting the same through the associated code-operated switch means when said normally open return circuit is closed and into said retrieval means.

5. A system of claim 4 wherein said data retrieval means includes clock pulse extractor means to generate a clock pulse for each data pulse of said data pulse train, said clock pulse extractor having an output connected to an AND gate, and connected to the inputs of a message marker detector and an end of message detector, the outputs of said message marker detector and said end of message detector also being connected to said AND gate, shift register means for receiving said data pulse train at one input thereof and for receiving the output signal from said AND gate at another input thereof, whereby the data pulse train is stored in said shift register and the blank space within said data pulse train will disable said end of message detector and set the data stored in said shift register means for readout purposes.

6. A system of claim 1 wherein each of said discrete data transmitting means includes switch means to insert data into parallel binary storage means, parallel-to-serial converter means for receiving the binary data, a binary counter for controlling the sequence of operation of said parallel-to-serial converter means to provide a data pulse train therefrom, a clock pulse generator for actuating said counter, said counter having a repeating cycle of operation and having a first output that produces a signal once during each cycle of the counter to provide a message marker along with the data pulse train.

7. A system according to claim 6 in which said counter has a second output to reset said counter upon generation of said message marker.

8. A system according to claim 1 in which said first terminal is in communicative connection with said code-interrogation means through a first coaxial cable, and said second terminal is in communicative connection with said discrete data transmitting means through a second coaxial cable such that said code-operated switch means is activated by the interrogation code sent through said first coaxial cable to open said circuit means to place said data retrieval means in communicative connection with said data transmitting means through said second coaxial cable.

9. A system according to claim 8 in which said code-operated switch means includes a receiver connected to said first terminal, a decoder-logic circuit for receiving an output from said receiver, said logic circuit having an output for activating said circuit means in said second coaxial cable to pass signals from said discrete data transmitting means to said data retrieval means upon receipt of said appropriate interrogation code 10. A system according to claim 1 wherein at least one of said data transmitting means includes keyboard means to be selectively operated to provide optional data information into said data retrieval means, said optional data information corresponding to an instruction within said data transmitting means.

11. A system according to claim 10 wherein said data transmitting means is connected to a television receiver which receives commercial advertisements, and wherein said optional data corresponds to a purchase order of merchandise displayed during said commercial advertisement.

12. In a coaxial cable communications system that includes video receivers connected to the cable for receiving video signals transmitted over the cable, the video receivers each including channel-selector means and data transmitting means associated with each receiver for supplying data indicative of the selected channel to which the receiver is tuned, the video receivers and their associated data transmitting means being in a plurality of identified groups and with each group being represented by a predetermined interrogation code, code-interrogation means for generating a code signal corresponding to a selected one of the interrogation codes representing a particular one of said groups, code-operated switch means in communicative connection with said code-interrogation means and also with data transmitting means of its associated group, said code-operated switch means providing a normally open return circuit for blocking transmission of data from said data transmitting means of a group unless the code signal to the associated code-operated switch means corresponds to the appropriate interrogation code, and data retrieval means in communicative connection with said code-operated switch means to receive data signals from said data transmitting means of the group which has been interrogated when said normally open return circuit is closed, said data retrieval means including means for ascertaining the tuned channel of each of the video receivers of the group as determined by the retrieval data.

13. In a system according to claim 12, each said data transmitting means of a group including RF transmission means of a known frequency, the frequencies of a number of data transmitting means in one group being substantially the same as the frequencies of a number of data transmitting means in another group.

14. A communication system for sending and receiving data, comprising in combination: data retrieval means having an input, a plurality of data transmitting groups at remote locations from said data retrieval means, each group including a plurality of discrete data transmitters, and code-operated switch means connected between each said data transmitting group and the input of said data retrieval means, said code-operated switch includes, an input terminal for coupling to all of said data transmitters of its associated data transmitting group, an output terminal for coupling to said input of said data retrieval means, a normally open circuit path between said input and output terminals for blocking the passage of signals from all operating data transmitters of said associated data transmitting group, said open circuit path including band pass amplifier means for passing signals from all of said data transmitters when said normally open circuit path is closed, and means responsive to an interrogation code applied to said code-operated switch for effecting closure of said normally open circuit path, whereby all operating data transmitters of said associated ata transmitting group are coupled to said input of said data retrieval means.

* * * * *

UNITED STATES PATENT OFFICE
CERTIFICATE OF CORRECTION

Patent No. 3786,424 Dated January 15, 1974

Inventor(s) DAVID S. MCVOY and RICHARD G. REYNOLDS

It is certified that error appears in the above-identified patent and that said Letters Patent are hereby corrected as shown below:

Column 6, line 53, change "witwith" to --with--
Column 7, line 67, change "comprises" to --comprised--
Column 9, line 45, change "providing" to --producing--
Column 11, line 36, change "form" to --from--
Column 11, line 52, change "inout" to --input--
Column 11, line 65, change "it" to "is"
Column 13, line 28, change "incorp_rate" to --incorporate"
Column 18, line 5, change "includes" to --including--
Column 18, line 20, change "_ata" to --data--

Signed and sealed this 1st day of October 1974.

(SEAL)
Attest:

McCOY M. GIBSON JR.
Attesting Officer

C. MARSHALL DANN
Commissioner of Patents